United States Patent
Ranta et al.

(10) Patent No.: US 8,531,393 B2
(45) Date of Patent: Sep. 10, 2013

(54) HANDHELD ELECTRONIC DEVICE HAVING HIDDEN SOUND OPENINGS OFFSET FROM AN AUDIO SOURCE

(75) Inventors: Craig E. Ranta, Waterloo (CA); Larry Hawker, Waterloo (CA); Jonathan Nobels, Guelph (CA)

(73) Assignee: BlackBerry Limited, Waterloo, Ontario (CA)

( * ) Notice: Subject to any disclaimer, the term of this patent is extended or adjusted under 35 U.S.C. 154(b) by 339 days.

(21) Appl. No.: 12/750,099

(22) Filed: Mar. 30, 2010

(65) Prior Publication Data
US 2010/0182741 A1 Jul. 22, 2010

Related U.S. Application Data

(62) Division of application No. 11/412,425, filed on Apr. 27, 2006, now Pat. No. 7,714,838.

(51) Int. Cl.
*G09G 5/00* (2006.01)

(52) U.S. Cl.
USPC ............ 345/156; 379/433.02; 381/386

(58) Field of Classification Search
USPC .......... 345/156; 379/428.01–428.03, 433.02, 379/419–456; 381/386, 373, 354, 345, 351, 381/388, 334, 339; 361/600, 679.01–679.3, 361/379.23; 455/350
See application file for complete search history.

(56) References Cited

U.S. PATENT DOCUMENTS

| | | | |
|---|---|---|---|
| 4,005,278 A | | 1/1977 | Gorike |
| 5,081,674 A | * | 1/1992 | Wijas et al. ............ 379/433.02 |
| 5,461,672 A | * | 10/1995 | Enokido et al. .......... 379/433.02 |
| 5,517,574 A | * | 5/1996 | Tichy ............................ 381/386 |
| 5,729,605 A | | 3/1998 | Bobisuthi et al. |
| 5,745,566 A | * | 4/1998 | Petrella et al. ............ 379/433.13 |
| 5,768,370 A | * | 6/1998 | Maatta et al. ............ 379/433.01 |
| 5,974,157 A | | 10/1999 | Tajima et al. |
| 5,999,821 A | * | 12/1999 | Kaschke .................... 455/575.1 |
| 6,021,195 A | * | 2/2000 | Brawne et al. ........... 379/433.02 |
| 6,144,738 A | | 11/2000 | Hawker et al. |

(Continued)

FOREIGN PATENT DOCUMENTS

| | | |
|---|---|---|
| EP | 1603308 A1 | 12/2005 |
| EP | 1610586 A1 | 12/2005 |
| JP | 58-003020 A | 1/1983 |
| WO | WO 02/034006 A2 | 4/2002 |

*Primary Examiner* — Koosha Sharifi-Tafreshi
(74) *Attorney, Agent, or Firm* — McCarthy Tétrault LLP (57) ABSTRACT

The disclosure relates to a case for a handheld electronic device and an electronic device. The case comprises: a housing and a lens. The housing has a housing surface; and a first opening in the housing surface. The lens has a cover surface being disposed adjacent at least a portion of the housing surface; an indentation formed in the cover adjacent the cover surface, the indentation being disposed between and forming a cavity in the case between at least a portion of the housing adjacent the housing surface and at least a portion of the cover adjacent the cover surface, the cavity being elongated along at least a first axis; and a second first opening formed in the cover providing fluid communication between the cavity and the cover surface. In the case, an audio transducer for the electronic device is disposable in the housing at a location underneath the first opening, placing the audio transducer in fluid communication with the cavity; and when the lens is disposed on the housing surface a periphery about the indentation is sealed against an opposing portion of the housing surface.

18 Claims, 7 Drawing Sheets

(56) References Cited

U.S. PATENT DOCUMENTS

| | | |
|---|---|---|
| 6,389,145 B2 | 5/2002 | Baumhauer et al. |
| 6,473,625 B1 | 10/2002 | Williams et al. |
| 6,553,119 B1 * | 4/2003 | Mori ........................ 379/433.11 |
| 6,594,472 B1 * | 7/2003 | Curtis et al. ............... 455/575.8 |
| 6,636,750 B1 | 10/2003 | Zurek et al. |
| 6,728,555 B1 * | 4/2004 | Pirila et al. .................... 455/566 |
| 6,907,955 B2 | 6/2005 | Masuda |
| 2002/0136399 A1 * | 9/2002 | Windeballe et al. ..... 379/433.03 |
| 2004/0170291 A1 | 9/2004 | Eaton |
| 2005/0181841 A1 * | 8/2005 | Dou .......................... 455/575.1 |
| 2005/0190941 A1 | 9/2005 | Yang |
| 2005/0265574 A1 * | 12/2005 | Holmes et al. ................ 381/388 |

* cited by examiner

HANDHELD ELECTRONIC DEVICE HAVING HIDDEN SOUND OPENINGS OFFSET FROM AN AUDIO SOURCE

RELATED APPLICATION

This application is a divisional application of U.S. patent application Ser. No. 11/412,425 filed Apr. 27, 2006.

FIELD

The disclosed and claimed concept relates generally to handheld electronic devices and, more particularly, to a handheld electronic device having a number of sound openings that are spaced from an audio transducer and are generally hidden from view.

DESCRIPTION OF THE RELATED ART

Numerous types of handheld electronic device are known. Examples of such handheld electronic devices include, for instance, personal data assistants (PDAs), handheld computers, two-way pagers, cellular telephones, and the like. Many handheld electronic devices also feature a wireless communication capability, although many such handheld electronic devices are stand-alone devices that are functional without communication with other devices.

Certain handheld electronic devices have loudspeakers that are intended to be placed against the ear of a user. Such handheld electronic devices would include telephones and electronic devices having a telephone capability, as well as other devices. Devices of this type typically include an audio transducer, i.e., a loudspeaker, disposed within a case at an end of the case. The case typically includes one or more sound openings formed therein adjacent a sound-producing element of the audio transducer. The sound openings provide fluid communication between the audio transducer and the atmosphere surrounding the handheld electronic device to enable sounds produced by the audio transducer to be transmitted to the atmosphere and to be heard by a user. While such devices have been generally effective for their intended purposes, such devices have not, however, been without limitation.

An electronic device having a loudspeaker that is intended to be held to the ear typically has a low output volume. In order for sound from the audio transducer to be received within the ear of the user, the outer ear desirably forms at least a partial seal with an outer surface of the electronic device in the region surrounding a sound opening. On some devices such as a conventional telephone, a seal can be achieved between the electronic device and the outer ear merely by placing the device against the outer ear. However, with relatively small handheld electronic devices, the sound openings can be disposed sufficiently close to an edge of the electronic device that an effective seal between the handheld electronic device and the user's ear can be difficult to establish. This is particularly the case with relatively small handheld electronic devices that are configured to include a relatively small output transducer as the loudspeaker. Such an output transducer is often disposed within a case as close as possible to an edge of the case for reasons of compactness. That is, a handheld electronic device typically will not include other electronic components that are disposed, for instance, between the audio transducer and the edge of the case. Handheld electronic devices of today typically employ printed circuit board architecture, with the result that electronic components typically will not be remote from the printed circuit board and disposed between an audio transducer and an interior edge of a case. To intentionally space an audio transducer from an edge of a case would typically result in the electronic device having a void region between the audio transducer and the edge of the case since such a region typically would not be occupied by other components of the electronic device. The result would be a case that is unnecessarily long and having undesirable void regions within an interior thereof.

It thus would be desirable to provide an alternative configuration that can overcome at least some of the aforementioned shortcomings in the art.

BRIEF DESCRIPTION OF THE DRAWINGS

A further understanding can be gained from the following Description when read in conjunction with the accompanying drawings in which.

Similar numerals refer to similar parts throughout the specification.

DESCRIPTION

In a first aspect, a case for a handheld electronic device is provided. The case comprises: a housing and a lens. The housing has a housing surface; and a first opening in the housing surface. The lens has a cover surface being disposed adjacent at least a portion of the housing surface; an indentation formed in the cover adjacent the cover surface, the indentation being disposed between and forming a cavity in the case between at least a portion of the housing adjacent the housing surface and at least a portion of the cover adjacent the cover surface, the cavity being elongated along at least a first axis; and a second first opening formed in the cover providing fluid communication between the cavity and the cover surface. In the case, an audio transducer for the electronic device is disposable in the housing at a location underneath the first opening, placing the audio transducer in fluid communication with the cavity; and when the lens is disposed on the housing surface a periphery about the indentation is sealed against an opposing portion of the housing surface.

In the case, the location for the transducer may place the center of the transducer closer to a first edge of the housing than the first opening to the first edge.

The case may further comprise a gasket for mounting atop the transducer to the location for the transducer.

In a second aspect, a handheld electronic device is provided. The device comprises a housing, a lens and an audio transducer. The housing has a housing surface; and a first opening in the housing surface. The lens has a cover surface being disposed adjacent at least a portion of the housing surface; an indentation formed in the cover adjacent the cover surface, the indentation being disposed between and forming a cavity in the case between at least a portion of the housing adjacent the housing surface and at least a portion of the cover adjacent the cover surface, the cavity being elongated along at least a first axis; and a second first opening formed in the cover providing fluid communication between the cavity and the cover surface. The audio transducer is disposable in the housing at a location underneath the first opening. When the lens is disposed on the housing surface a periphery about the indentation is sealed against an opposing portion of the housing surface.

In the device, the location for the transducer may place the center of the transducer closer to a first edge of the housing than the first opening to the first edge.

The electronic device may further comprise a gasket for mounting atop the transducer to the location for the transducer.

In another aspect, a handheld electronic device is provided. The device comprises: a case comprising a housing and a cover, the housing having a housing surface, the cover having a cover surface and having an elongated channel formed therein opposite the cover surface; an output apparatus comprising an audio transducer disposed on the housing; the case having an indentation formed in at least one of the housing adjacent the housing surface and the cover adjacent the cover surface; at least a portion of the cover surface being disposed adjacent at least a portion of the housing surface; the indentation being disposed between and forming a cavity in the case between at least a portion of the housing adjacent the housing surface and at least a portion of the cover adjacent the cover surface, the cavity being elongated along at least a first axis; the audio transducer being in fluid communication with the cavity; the case having at least a first opening formed therein providing fluid communication between the cavity and the channel; and the at least first opening being spaced along the at least first axis from the audio transducer.

In the device, the indentation and the at least first opening may be formed in the cover.

In the device, the cover may comprise an insert and a lens disposed adjacent one another, the indentation and the at least first opening being formed in the insert, the channel being disposed between the insert and the lens.

In the device, the first opening may face the lens.

In the device, at least a portion of the lens may overlie at least a portion of the insert.

In the device, the insert may comprise a body and a tongue, the tongue protruding from the body, at least a portion of the cover surface being disposed on the tongue, the portion of the lens overlying at least a portion of the tongue.

In the device, the case may comprise a seal disposed between the housing and at least a portion of the tongue about a periphery of the cavity.

In the device, the body may have at least a first passage formed therein, the passage extending between the cavity and the at least first opening, the passage being disposed between the tongue and the cavity.

In the device, the passage may be formed in the body adjacent the cover surface.

Figure 1:
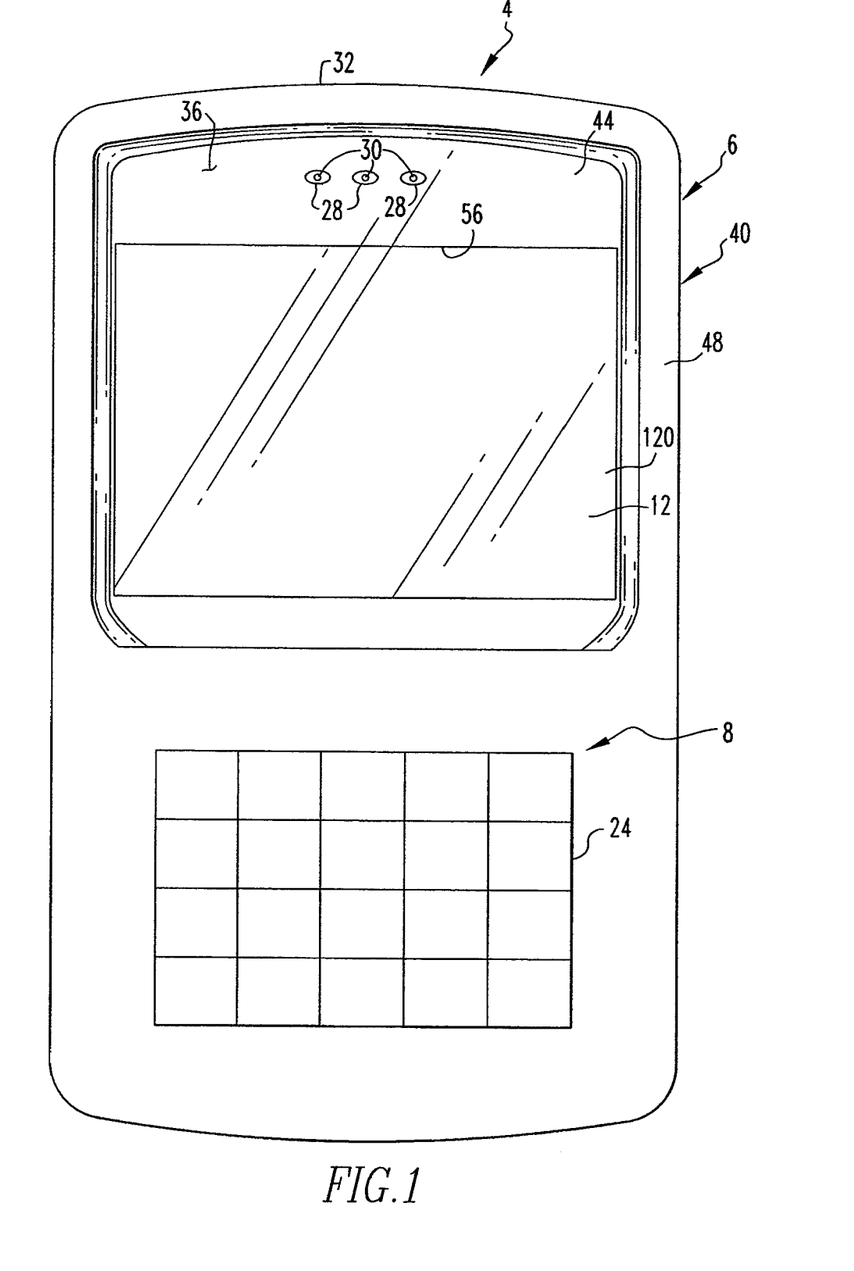
FIG. 1 is a front elevational view of an improved handheld electronic device in accordance with a first embodiment of the disclosed and claimed concept.
Figure 2:
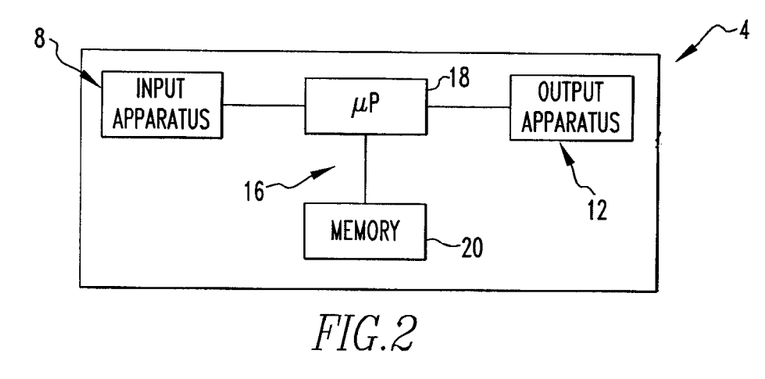
FIG. 2 is a schematic depiction of the handheld electronic device of FIG. 1.

An improved handheld electronic device 4 is indicated generally in FIG. 1 and is depicted schematically in FIG. 2. The exemplary handheld electronic device 4 includes a case 6 upon which is disposed an operational apparatus that can be said to comprise an input apparatus 8, an output apparatus 12, and a processor apparatus 16. The processor apparatus 16 includes a processor 18 and a memory 20. The processor 18 may be, for instance and without limitation, a microprocessor (μP), and is responsive to inputs from the input apparatus 8 and provides output signals to the output apparatus 12. The processor 18 also interfaces with the memory 20. The memory 20 can be any one or more of RAM, ROM, EPROM(s), EEPROM(s), and/or other memory devices.

The input apparatus 8 includes a schematically depicted keypad 24 disposed on the case 6. As can be seen in FIG. 1, the case 6 has a number of sound openings 28 formed therein. As employed herein, the expression "a number of" and variations thereof shall refer broadly to any nonzero quantity, including a quantity of one. Each sound opening 28 is disposed at an end of a passage 30 formed in the case 6. The passages 30, and thus the sound openings 28, are advantageously spaced from a first edge 32 of the handheld electronic device 4. The sound openings 28 can generally be said to be formed in the case 6 at a front surface 36 of the handheld electronic device 4. The spacing of the sound openings 28 from the first edge 32 advantageously enables the user to form a seal between the user's ear and the front surface 36, which enables the user to hear sound produced through the sound openings 28. As employed herein, the expression "seal" and variations thereof shall refer broadly to a type of interface between two articles wherein fluid flow through the interface, i.e., between the articles, is resisted.

Figure 6:
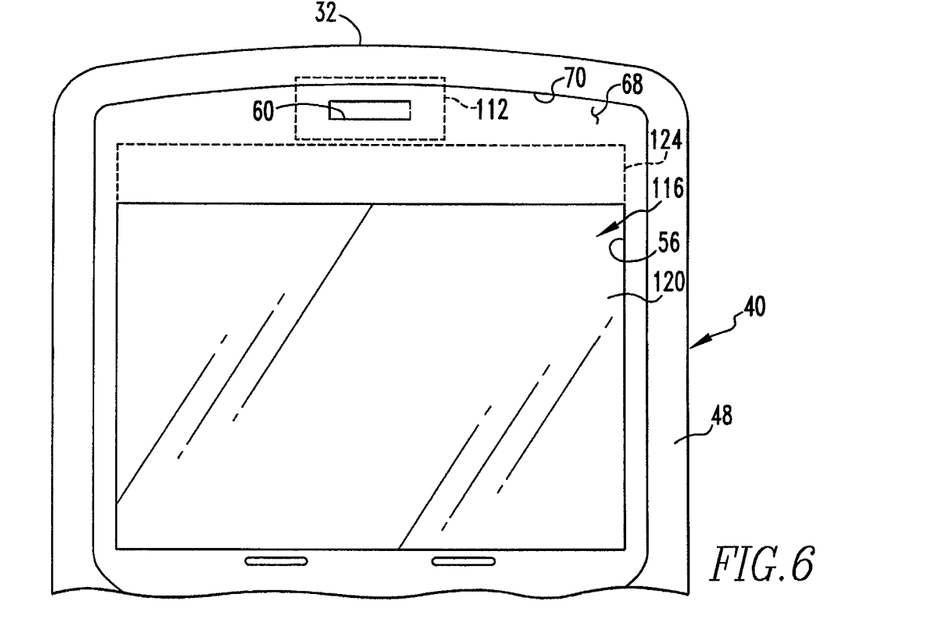
FIG. 6 is a view similar to FIG. 3, except having a lens of the handheld electronic device removed.
Figure 7:
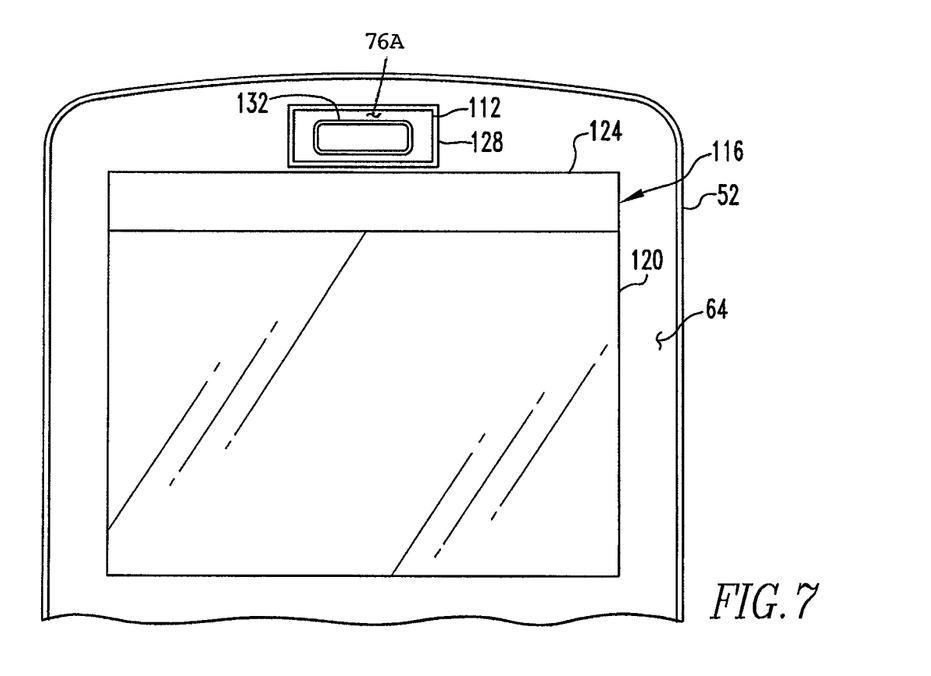
FIG. 7 is a view of a portion of an interior region of the handheld electronic device of FIG. 1.

The case 6 includes a housing 40 and a lens 44, with the lens 44 being disposed on the housing 40. In the present embodiment the lens 44 can be said to serve as a cover, it being understood that other types of covers may be employed in different embodiments. The housing 40 includes a front portion 48 and a rear portion 52 (FIG. 7). FIG. 6 generally depicts the handheld electronic device 4 with the lens 44 removed. FIG. 7 depicts the handheld electronic device 4 with the front portion 48 of the housing 40 additionally removed. As is best shown in FIG. 6, the front portion 48 has a window 56 and a transducer hole 60 formed therein. The front and rear portions 48 and 52 when assembled together have a hollow interior region 64 (FIG. 7) disposed generally therebetween. The window 56 is in communication with the interior region 64.

Figure 4:
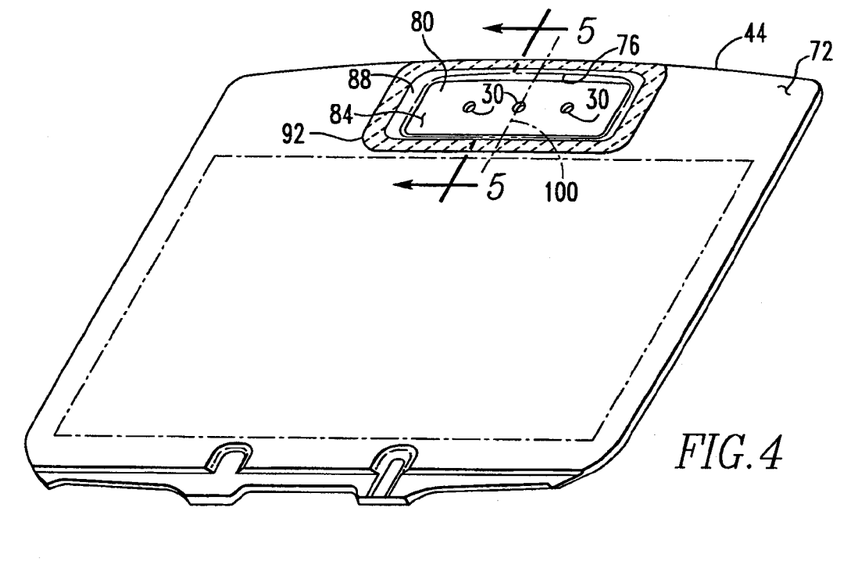
FIG. 4 is a perspective view of a portion of the handheld electronic device of FIG. 1.

The front portion 48 includes a housing surface 68 (FIG. 6) disposed adjacent the window 56. In the present exemplary embodiment, the front portion 48 has a seat 70 formed therein within which the lens 44 is disposed. The housing surface 68 is generally disposed in the front portion 48 within the seat 70. As can be seen in FIG. 4, the lens 44 has a lens surface 72. When assembled, the lens surface 72 is disposed on the housing surface 68.

As can further be seen in FIG. 4, the lens 44 has an indentation 76 formed therein adjacent the lens surface 72. The lens 44 thus includes a floor portion 80 adjacent the indentation 76, with the floor portion 80 having a floor surface 84 adjacent the indentation 76. The lens 44 also has a peripheral surface 88 adjacent the indentation 76 that extends between the floor surface 84 and the lens surface 72. A periphery about the indentation 76 is indicated generally at the numeral 92 on the portion of the lens surface 72 surrounding the indentation 76. It can be seen that the passages 30 are formed in the floor portion 80 of the lens 44.

When the lens surface 72 is disposed on the housing surface 68, the periphery 92 about the indentation 76 is sealed to the opposing portion of the housing surface 68 to form a substantially sealed cavity 96 between at least a portion of the lens 44 adjacent the lens surface 72 and at least a portion of the housing 40 adjacent the housing surface 68. Such a seal can be formed in any of a variety of ways, such as with the use of adhesives, welding techniques, forming techniques, and the like.

It is understood that the cavity 96 is substantially sealed, except that the transducer hole 60 and the sound openings 28 are in fluid communication with an interior of the cavity 96 and with the exterior of the cavity 96. The cavity 96 is elongated along a first axis indicated generally at the numeral 100 in FIG. 4. The first axis 100 is oriented substantially parallel with the floor surface 84. As can be understood from FIGS. 4 and 5, the cavity 96 is elongated along another axis transverse to the first axis 100, whereby the cavity 96 can be said to be elongated along a plane defined by the first axis 100 and the axis transverse thereto.

Figure 5:
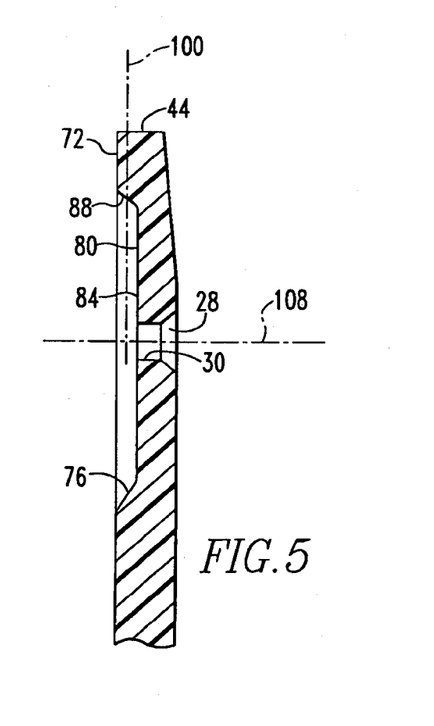
FIG. 5 is a sectional view as taken along line 5-5 of FIG. 4.

As can further be seen in FIGS. 4 and 5, the passages 30 in the present exemplary embodiment extend through the floor portion 80 along a second axis 108 that is oriented substantially orthogonal to the first axis 100. Other configurations in other embodiments are possible.

Figure 3:
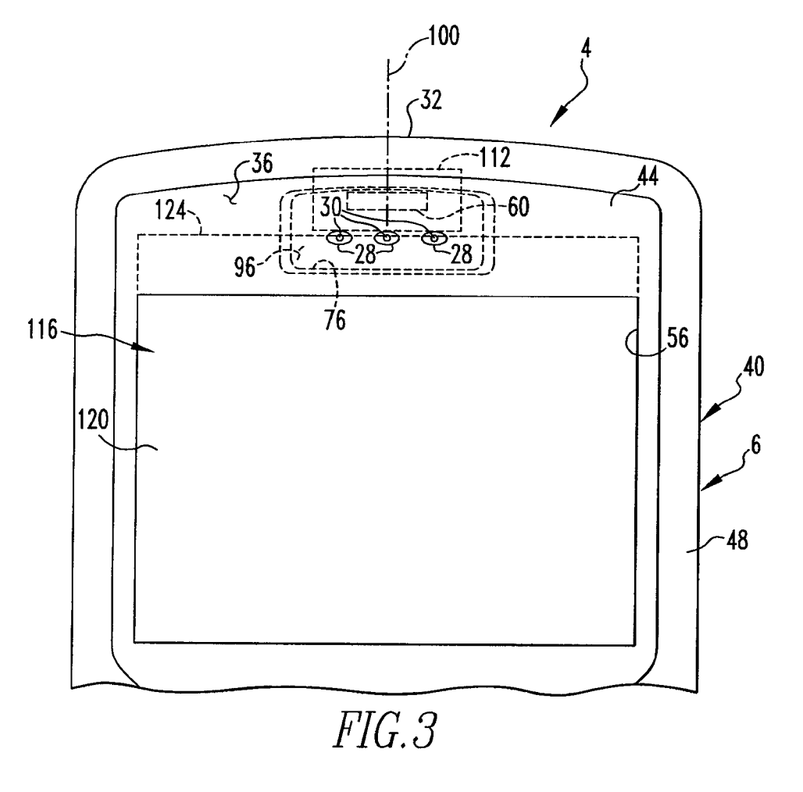
FIG. 3 is an enlarged front elevational view of a portion of the handheld electronic device of FIG. 1.

As is best understood in FIGS. 3 and 7, the output apparatus 12 includes an audio transducer 112 and a display 116 disposed on the rear portion 52 of the housing 40. The audio transducer 112 in the present example is a loudspeaker disposed in a receptacle 128 (FIG. 7) on the rear portion 52. The display 116 includes a screen 120 and a connection apparatus 124. The display 116 and the audio transducer 112 are disposed within the interior region 64 of the housing 40. The screen 120 is disposed adjacent the window 56 and is visible through the window 56 to an observer disposed at the exterior of the housing 40. It is understood that the atmosphere is disposed generally at the exterior of the housing 40.

The connection apparatus 124 is connected (not shown in FIG. 7) with the processor apparatus 16. As can be seen in FIG. 7, the audio transducer 112 disposed in the receptacle 128 is disposed adjacent the connection apparatus 124 of the display 116. As is understood in the relevant art, the display 116 is a unitary structure, and the connection apparatus 124 provides the means by which the screen 120 is operatively connected with the processor apparatus 16 to enable signals from the processor apparatus 16 to be provided to the screen 120 for visual output.

A gasket 132 is depicted in FIG. 7 as being disposed atop a sound-producing element of the audio transducer 112. The gasket 132 forms a seal against the underside (not expressly depicted herein) of the front portion 48 in the region surrounding the transducer hole 60 to provide a substantially airtight seal between the audio transducer 112 and the front portion 48, which enables sound produced by the audio transducer 112 to travel through the cavity 96 between the transducer hole 60 and the sound openings 28.

The lens 44 is at least partially translucent and at least partially overlies the screen 120. As employed herein, the expression "translucent" and variations thereof shall refer broadly to a quality that permits the passage of light and may include a transparent quality wherein light is transmitted without appreciable scattering so that it does not meaningfully alter light waves traveling therethrough.

As can be understood from FIG. 3, the audio transducer 112 is disposed closely adjacent the first edge 32 of the case 6. The centers of the sound openings 28 are spaced farther from the first edge 32 than a center of the audio transducer 112. In the present exemplary embodiment, the center of the audio transducer 112 is indicated generally by the placement of the transducer hole 60, as in FIG. 6.

The cavity 96 in the present exemplary embodiment is configured to form a Helmholtz resonator that enables sounds produced by the audio transducer 112 to be received through the transducer hole 60, into the interior of the cavity 96, and out of the sound openings 28 where the sounds can be heard by a user, such as when the user has formed a seal between the user's ear and the front surface 36 of the case 6. In the present exemplary embodiment, the cavity 96 has an interior volume on the order of about 150 cubic millimeters, although other configurations may be appropriate. In the present exemplary embodiment, the centers of the sound openings 28 are spaced about 13-16 millimeters from the first edge 32, and the spacing, center-to-center, between the outermost sound openings 28 is about 10-12 millimeters, although other configurations may be appropriate.

The exemplary indentation 76 is formed in the lens 44 and is of a depth of about 0.6-0.8 millimeters, although other configurations could be employed. It is also noted that in other embodiments a portion of the indentation 76 could be formed in the front portion 48 of the housing 40 without departing from the present concept. For example, the receptacle 128, discussed below and shown in FIG. 7, may be recessed so as to form an indentation 76A in the housing surface 68. That is, the cavity 96 could be formed in both the lens 44 and the housing 40 depending on the desired configuration.

It is understood that telephone communication typically occurs in the range of about 300-3400 hertz, and that a transducer such as the audio transducer 112 typically operates in the 300-2000 hertz range. The audio transducer 112 typically will produce frequencies above 2000 hertz only at a relatively low amplitude. The Helmholtz resonator provided by the cavity 96, the transducer hole 60, and/or the sound openings 28 is tuned to about 3000 hertz, thus amplifying those relatively higher frequencies that typically would be at a relatively small amplitude from the audio transducer 112, and generally leaving other frequencies alone. As such, the Helmholtz resonator provided by the case 6 can be said to be configured to provide relatively better audio response in certain respects than the audio response of the audio transducer 112 by itself. It is noted that the audio signals generated by the audio transducer 112 are typically the subject of digital signal processing according to an acoustic model that takes into consideration the frequency response of the cavity 96 to provide an overall desirable frequency output at the sound openings 28.

The cavity 96 thus advantageously enables the sound openings 28 to be spaced away from a position directly above the audio transducer 112 to a position offset therefrom along the first axis 100. The audio transducer 112, being in fluid communication with the cavity 96 though the transducer hole 60, enables sounds from the audio transducer 112 to be communicated to the interior of the cavity 96. The sound openings 28, which are in fluid communication with both the interior of the cavity 96 and the atmosphere via the passages 30, enable sounds produced by the audio transducer 112 and provided to the cavity 96 to be transmitted through the cavity 96, through the sound openings 28, and into the atmosphere.

In this regard, when the user has at least partially formed a seal between the user's ear and the front surface 36 of the case 6, the sounds desirably can enter the ear and can be accurately perceived by the user. The cavity 96 is thus configured to extend between a first position adjacent (i.e., above, from the perspective of FIG. 3) the audio transducer 112, and thus adjacent (i.e., above, from the perspective of FIG. 3) the transducer hole 60, and a second position adjacent (i.e., above, from the perspective of FIG. 3) the display 116. It can be understood that the display 116 serves as a limiting feature or structure that limits placement of the audio transducer 112 to a position at most adjacent, but not above (from the perspective of FIG. 3,) the display 116.

The cavity 96 advantageously enables the sound openings 28 to be positioned at a location that is desirable for the transmission of sound into the interior of the user's ear without particular regard for the precise location of the audio transducer 112. Moreover, the sound openings 28 are spaced along the first axis 100 from the transducer hole 60. It additionally can be seen that the sound openings 28, from the perspective of FIG. 3, overly at least a portion of the display 116 and, more specifically, a portion of the connection apparatus 124. It is understood, however, that other configurations of the cavity 96 and other positionings of the sound openings 28 with respect to the audio transducer 112 and/or with respect to the first edge 32 can be employed. The sound openings 28 can be spaced from the audio transducer 112, yet desirably would not be disposed above the screen 120 where they otherwise might interfere with the user's visual perception of the screen 120.

Figure 8:
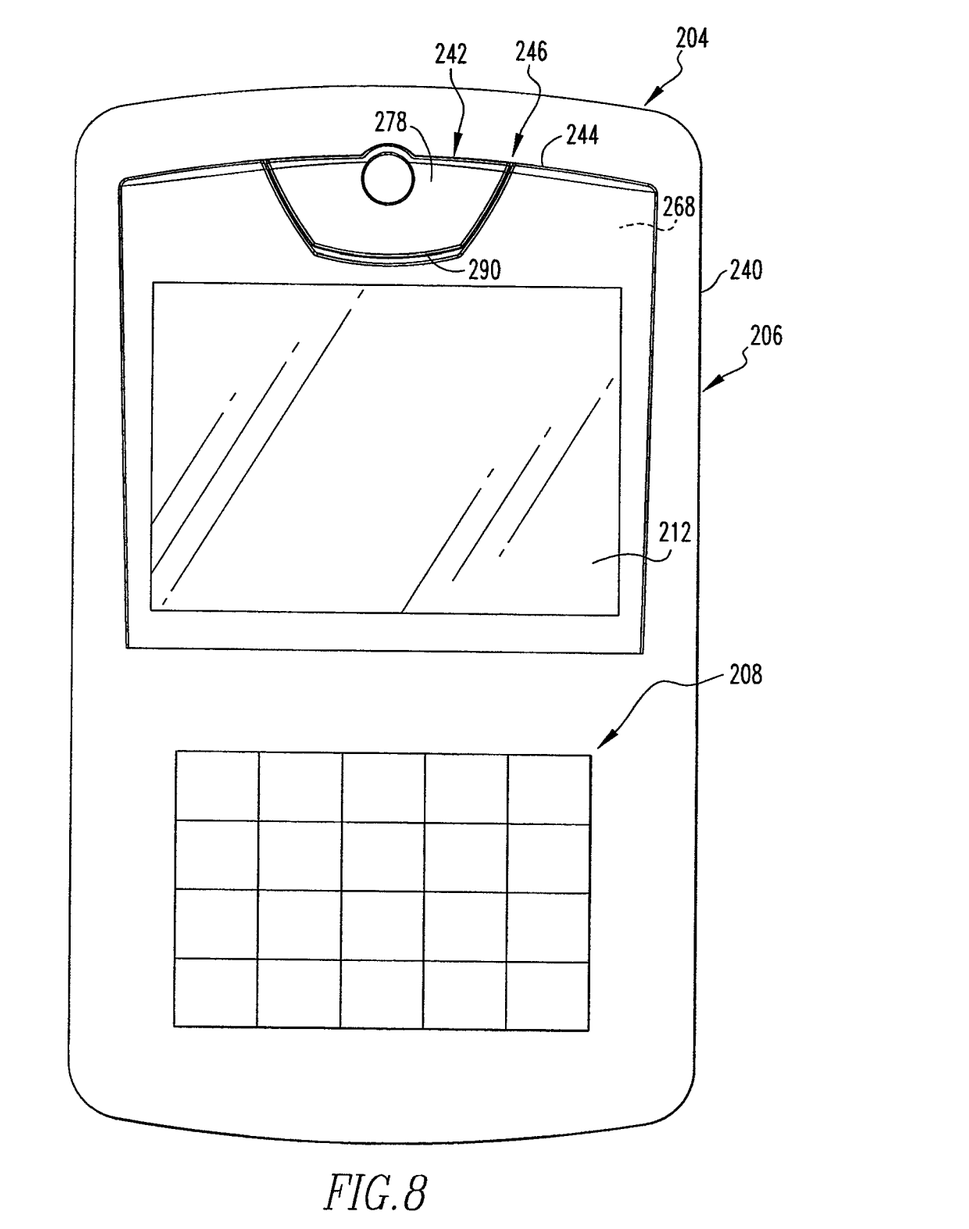
FIG. 8 is a front elevational view of an improved handheld electronic device in accordance with a second embodiment of the disclosed and claimed concept.
Figure 11:
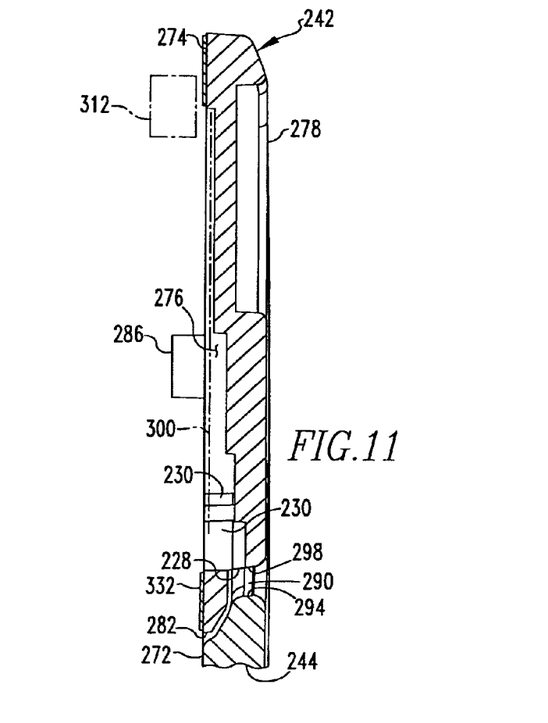
FIG. 11 is a sectional view as taken along line 11-11 of FIG. 9 and additionally depicting a gasket of the handheld electronic device of FIG. 8.

Another improved handheld electronic device 204 in accordance with a second embodiment of this disclosed and claimed concept is depicted generally in FIG. 8. The handheld electronic device 204 is similar to the handheld electronic device 4 in that it includes a case 206 upon which are disposed an input apparatus 208, an output apparatus 212, and a processor apparatus (not shown). Moreover, the case 206 comprises a housing 240 upon which is disposed a cover 246. However, the cover 246 of the handheld electronic device 204 comprises a lens 244 and an insert 242. The cover 246 can be said to have a cover surface 270 which comprises a lens surface 272 disposed on the lens 244 and an insert surface 274 disposed on the insert 242. The insert 242 is mounted to the housing 240 with the insert surface 274 being disposed on the housing surface 268, it being understood that a gasket 332, as is best shown in FIG. 11, is disposed therebetween. The insert 242 has an indentation 276 formed therein adjacent the insert surface 274. When the insert 242 is disposed on the housing 240, the indentation 276 forms a cavity between the insert 242 and the housing 240 which forms a Helmholtz resonator, such as is provided on the handheld electronic device 4.

Figure 9:
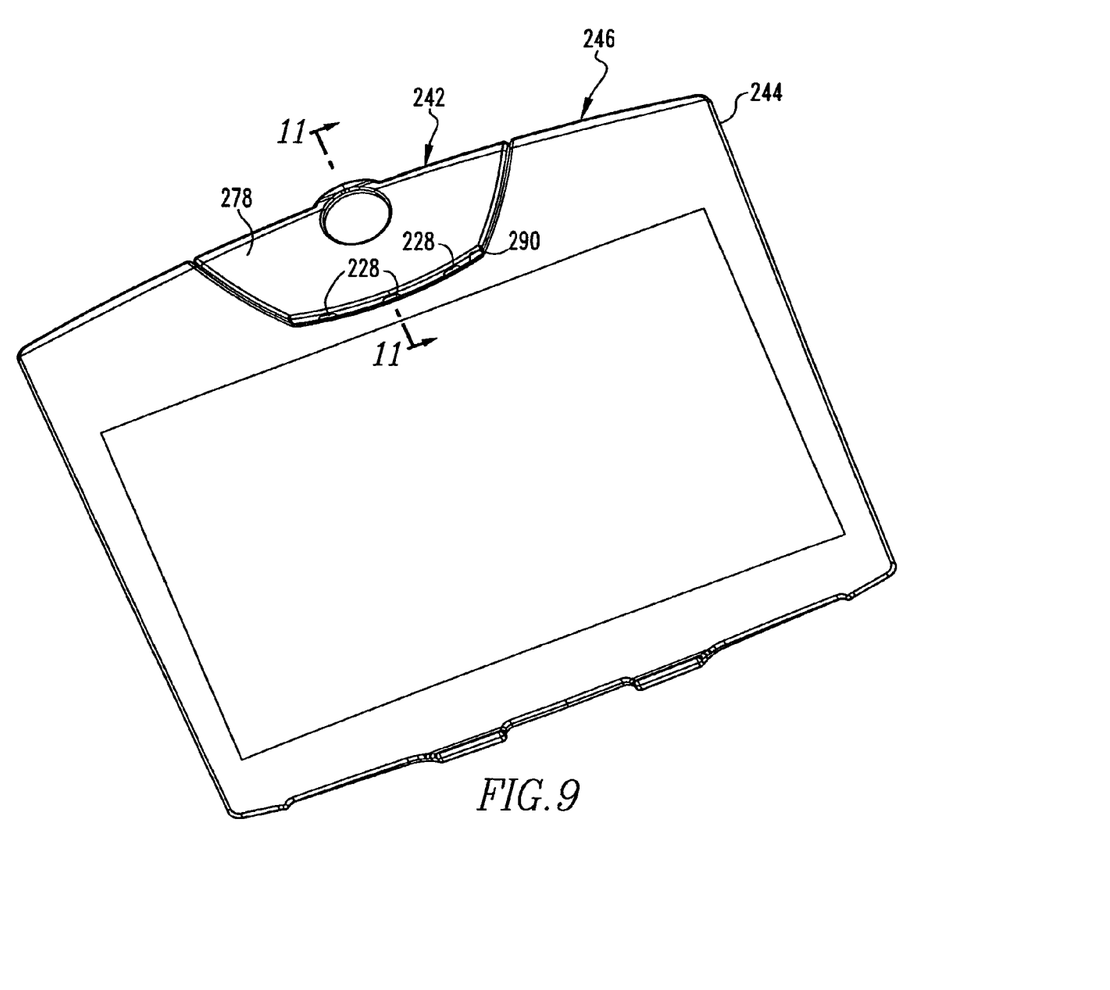
FIG. 9 is a perspective view of a portion of the handheld electronic device of FIG. 8.
Figure 10:
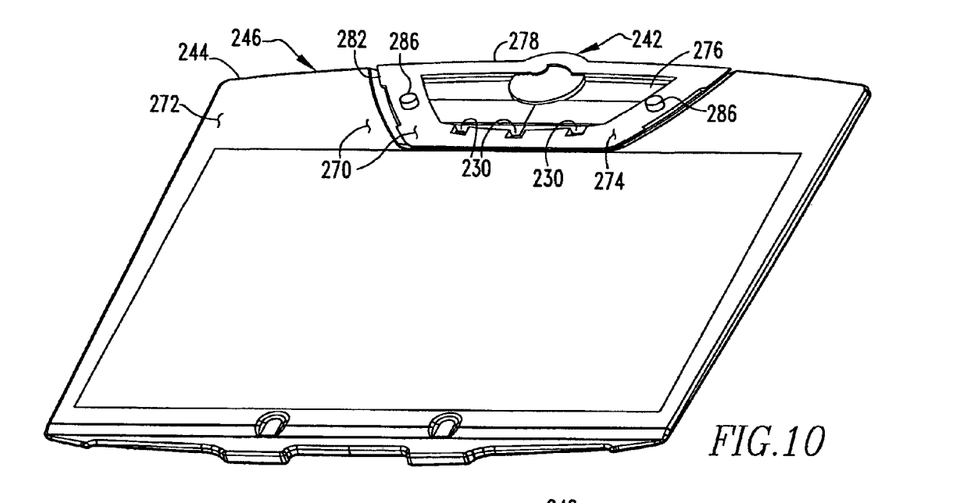
FIG. 10 is another perspective view of a portion of the handheld electronic device of FIG. 8.

As is best shown in FIGS. 10 and 11, the insert 242 has a plurality of passages 230 formed therein adjacent the insert surface 274. Each passage 230 extends between the indentation 276 and a sound opening 228 on the insert 242. The sound openings 228 are advantageously largely hidden from view when observed from the front of the handheld electronic device 204, but which can be at least partially viewed when seen from a proper angle, such as is shown in FIG. 9.

More specifically, the insert 242 and the lens 244 are disposed adjacent one another. As can be seen in FIG. 11, a portion of the lens 244 overlies a portion of the insert 242. A lens lateral surface 294 of the lens 244 is in a confronting relationship and is spaced from an insert lateral surface 298 of the insert 242, and a channel 290 thus exists between the lens lateral surface 294 and the insert lateral surface 298. The channel 290 is in fluid communication with the atmosphere.

As can be understood from FIGS. 9 and 11, the sound openings 228 are formed in the insert lateral surface 298 and face the lens lateral surface 294. As such, it can be seen that the passages 230, and thus the sound openings 228, provide fluid communication between the channel 290 and the indentation 276. Fluid communication is thereby enabled between the channel 290 and the cavity formed between the indentation 276 and the housing 240.

As can further be seen from FIG. 11, the insert 242 comprises a body 278, a tongue 282, and a pair of lugs 286. The tongue 282 protrudes outwardly from the body 278, and at least a portion of the insert surface 274 is disposed on the tongue 282. The lugs 286 protrude from the insert surface 274 and enable mechanical attachment of the insert 242 to the housing 240. The passages 230 are formed in the body 278 and are disposed generally between the tongue 282 and the indentation 276. At least a portion of the lens 244 overlies at least a portion of the tongue 282.

The passages 230 and the sound openings 228 can been seen to be spaced along an axis 300 from the audio transducer 312, such as is depicted in an exemplary and schematic fashion in FIG. 11. This advantageously facilitates the user forming a seal between the handheld electronic device 204 and the user's ear for listening to sounds produced by the audio transducer 312. That is, the positioning of the passages 230 and the sound openings 228 enables sound to be provided to the channel 290, which can then be received in the user's ear.

The positioning of the passages 230 and the sound openings 228 enables the generation of audible output in an aesthetically pleasing fashion by providing the sound openings 228 in a position substantially hidden from view when observed from the front of the handheld electronic device 204. Such positioning of the sound openings in a position offset from the audio transducer 312 enables the formation of a seal between the user's ear and the case 206.

Moreover, by providing the insert 242 as a component separate from the lens 244, the mounting of the insert 242 to the housing 240 is greatly simplified. Specifically, the gasket 332 creates a seal about a periphery of the indentation 276 between the insert 242 and the housing 240, thereby sealing the cavity formed by the indentation 276 and the housing 240. By providing the insert 242 as a component separate from the lens 244, i.e., the insert 242 by itself is a relatively smaller component than the combination of the insert 242 and the lens 244, the cavity formed by the indentation 276 and the housing 240 can be more readily sealed. That is, the insert 242 is in a sealable configuration. Configuring the insert 242 alone in a sealable configuration is more cost effective, and is thus more advantageous, than a configuration wherein both the insert 242 and the lens 244 would be configured to be of a sealable configuration. Also, the seal provided between the housing 240 and the insert 242 by the gasket 332 has a tendency to be more stable and reliable than would be a seal between the housing 240 and a component relatively larger than the insert 242. Moreover, the insert 242 as a separate component can be readily customized with various colors, logos, etc., which is advantageous.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

The invention claimed is:

1. A case for a handheld electronic device, the case comprising:
   a housing having
      a housing surface; and
      a first opening in the housing surface;

and
a lens for mating with an insert when covering a display, the lens having
a cover surface being disposed adjacent at least a portion of the housing surface;
an indentation in the cover surface forming a cavity in the case between a portion of the housing adjacent the housing surface and a portion of the cover surface, the cavity being elongated along a first axis; and
a second opening formed in the cover surface providing fluid communication between the cavity and the cover surface,
wherein
when an audio transducer is disposed in the housing at a location underneath the first opening, the audio transducer is placed in fluid communication with the cavity;
when the lens is disposed on the housing surface a periphery of the lens about the indentation is sealed against an opposing portion of the housing surface;
when the lens is disposed on the housing surface adjacent to the insert the periphery about the indentation is sealed; and
at least a portion of the lens overlies a tongue protruding from a body of the insert.

2. The case for a handheld electronic device as claimed in claim 1, wherein the location for the transducer is closer to a first edge of the housing than the first opening is to the first edge.

3. A handheld electronic device, comprising:
a housing having
a housing surface; and
a first opening in the housing surface;
a lens for mating with an insert when covering a display, the lens having
a cover surface being disposed adjacent at least a portion of the housing surface;
an indentation in the cover surface forming a cavity in the housing between a portion of the housing adjacent the housing surface and a portion of the cover surface; and
a second opening formed in the cover surface providing fluid communication between the cavity and the cover surface;
and
an audio transducer disposable in the housing at a location underneath the first opening,
wherein
when the audio transducer is disposed at a location underneath the first opening, the audio transducer is placed in fluid communication with the cavity;
when the lens is disposed on the housing surface a periphery of the lens about the indentation is sealed against an opposing portion of the housing surface;
when the lens is disposed on the housing surface adjacent to the insert the periphery about the indentation is sealed; and
at least a portion of the lens overlies a tongue protruding from a body of the insert.

4. The handheld electronic device as claimed in claim 3, wherein the location for the audio transducer places a transducer hole of the audio transducer closer to a first edge of the housing than the first opening is located to the first edge.

5. The handheld electronic device as claimed in claim 3, wherein the location offsets a transducer hole of the audio transducer from the second opening.

6. The handheld electronic device as claimed in claim 5, wherein:

the housing further has a receptacle located underneath the first opening at the location; and
the audio transducer is disposable in the receptacle.

7. The case for a handheld electronic device as claimed in claim 1, wherein the location places a transducer hole of the audio transducer offset from the second opening.

8. The case for a handheld electronic device as claimed in claim 7, wherein:
the housing further has a receptacle located underneath the first opening at the location; and
the audio transducer is disposable in the receptacle.

9. A handheld electronic device, comprising:
a housing having
a housing surface;
a first opening in the housing surface; and
a receptacle located underneath the first opening;
a lens for mating with an insert when covering a display in the handheld electronic device, the lens having
a cover surface being disposed adjacent at least a portion of the housing surface;
an indentation in the cover surface forming a cavity in the housing between a portion of the housing adjacent the housing surface and a portion of the cover surface, the cavity being elongated along at least a first axis; and
a second opening formed in the cover surface providing fluid communication between the cavity and the cover surface;
and
an audio transducer disposable in the receptacle,
wherein
when the audio transducer is disposed in the receptacle, a center of the audio transducer is located closer to a first edge of the housing than the first opening is located to the first edge;
when the lens is disposed on the housing surface a periphery about the indentation is sealed against an opposing portion of the housing surface;
when the lens is disposed on the housing surface adjacent to the insert the periphery about the indentation is sealed; and
at least a portion of the lens overlies a tongue protruding from a body of the insert.

10. The case for a handheld electronic device as claimed in claim 1, wherein the insert comprises:
a gasket for mounting atop the audio transducer.

11. The case for a handheld electronic device as claimed in claim 1, wherein the lens further has
a top edge having a recess therein, the recess shaped to receive the insert.

12. The case for a handheld electronic device as claimed in claim 11, wherein the recess is bevelled along its top edge.

13. The handheld electronic device as claimed in claim 9, wherein the insert comprises:
a gasket for mounting atop the audio transducer.

14. The handheld electronic device as claimed in claim 9, wherein the lens further has
a top edge having a recess therein, the recess shaped to receive the insert.

15. The handheld electronic device as claimed in claim 14, wherein the recess is bevelled along its top edge.

16. The case for a handheld electronic device as claimed in claim 1, wherein the lens further has
a top edge having a recess therein, the recess shaped to receive the insert.

17. The case for a handheld electronic device as claimed in claim 16, wherein the recess is bevelled along its top edge.

18. The handheld electronic device as claimed in claim 9, wherein the location offsets a transducer hole of the transducer from the second opening.

\* \* \* \* \*